(12) United States Patent
Moreno

(10) Patent No.: US 7,707,729 B2
(45) Date of Patent: May 4, 2010

(54) DRIVE MECHANISM FOR A RECIPROCATING TOOL

(75) Inventor: Jaime Moreno, Arlington Heights, IL (US)

(73) Assignee: Robert Bosch GmbH, Stuttgart (DE)

(*) Notice: Subject to any disclaimer, the term of this patent is extended or adjusted under 35 U.S.C. 154(b) by 272 days.

(21) Appl. No.: 11/701,923

(22) Filed: Feb. 2, 2007

(65) Prior Publication Data

US 2008/0184569 A1    Aug. 7, 2008

(51) Int. Cl.
    *B23D 49/08* (2006.01)
(52) U.S. Cl. .......................................... 30/394; 30/392
(58) Field of Classification Search .................. 30/394, 30/392, 393; 83/776–780
    See application file for complete search history.

(56) References Cited

U.S. PATENT DOCUMENTS

| | | | | |
|---|---|---|---|---|
| 3,206,989 | A * | 9/1965 | Enders .......................... | 74/50 |
| 3,333,513 | A * | 8/1967 | Wettstein ................... | 92/165 R |
| 3,942,251 | A * | 3/1976 | Griffies et al. ................ | 30/376 |
| 3,971,132 | A * | 7/1976 | Griffies et al. ................ | 30/393 |
| 4,114,270 | A * | 9/1978 | Jansen-Herfeld et al. ...... | 30/394 |
| 5,009,012 | A * | 4/1991 | Martinez et al. .............. | 30/394 |
| 5,025,562 | A   | 6/1991 | Palm | |
| 5,050,307 | A * | 9/1991 | Palm .......................... | 30/392 |
| 5,555,626 | A * | 9/1996 | Fuchs .......................... | 30/393 |
| 5,566,458 | A * | 10/1996 | Bednar ........................ | 30/392 |
| 5,782,000 | A * | 7/1998 | Bednar ........................ | 30/393 |
| 6,212,781 | B1* | 4/2001 | Marinkovich et al. ......... | 30/394 |
| RE37,211  | E * | 6/2001 | Bednar et al. ................. | 30/394 |
| 6,249,979 | B1* | 6/2001 | Bednar et al. ................. | 30/392 |
| 6,282,797 | B1  | 9/2001 | Osada et al. | |
| 6,286,217 | B1* | 9/2001 | Dassoulas et al. ............. | 30/392 |
| 6,508,151 | B1* | 1/2003 | Neitzell ........................ | 83/34 |
| 6,634,107 | B2* | 10/2003 | Osada ......................... | 30/392 |
| 6,662,455 | B2* | 12/2003 | Tachibana et al. ............. | 30/393 |
| 6,688,005 | B1  | 2/2004 | Tachibana et al. | |
| 6,758,119 | B1* | 7/2004 | Neitzell ........................ | 83/34 |
| 6,772,662 | B2  | 8/2004 | Marinkovich et al. | |
| RE38,606  | E * | 10/2004 | Bednar et al. ................. | 30/394 |
| 6,829,831 | B1* | 12/2004 | Neitzell ....................... | 30/393 |

(Continued)

FOREIGN PATENT DOCUMENTS

| | | |
|---|---|---|
| EP | 1593448 | 11/2005 |
| WO | WO 00/47358 | 8/2000 |

*Primary Examiner*—Kenneth E. Peterson
*Assistant Examiner*—Sean Michalski
(74) *Attorney, Agent, or Firm*—Greer, Burns & Crain, Ltd.

(57) ABSTRACT

A reciprocating tool comprising a drive shaft and a motor, a plunger for reciprocating motion, the plunger being driven by a wobble plate and pivotally supported in a front bushing and in a manner not prohibiting the plunger to rotate about a longitudinal axis of rotation, the plunger has a rear spherical end, a movable counterweight and a drive arm for moving the counterweight, the counterweight having an opening for receiving the plunger, the opening has side walls that support the rear spherical end of the plunger as it moves relative to the counterweight, a first wobble plate assembly connected to the drive shaft and having a first wobble plate interface engaging and reciprocating the plunger in the front bushing and the counterweight; and a second wobble plate assembly operatively connected to the drive shaft and having a second wobble plate interface engaging the drive arm of the counterweight.

24 Claims, 9 Drawing Sheets

U.S. PATENT DOCUMENTS

| | | |
|---|---|---|
| 6,851,193 B2 | 2/2005 | Bednar et al. |
| 6,877,235 B2 * | 4/2005 | Osada ......................... 30/394 |
| 7,117,601 B2 * | 10/2006 | Hai-Chun ................... 30/392 |
| 7,127,973 B2 * | 10/2006 | Neitzell et al. ................. 83/34 |
| 7,168,169 B2 * | 1/2007 | Moreno ....................... 30/394 |
| 7,448,137 B2 * | 11/2008 | Neitzell et al. ............... 30/392 |
| 2001/0011420 A1 * | 8/2001 | Osada ......................... 30/392 |
| 2001/0034941 A1 * | 11/2001 | Bednar et al. ................ 30/392 |
| 2003/0051352 A1 | 3/2003 | Clark, Jr. |
| 2005/0016001 A1 * | 1/2005 | Griep et al. .................. 30/394 |
| 2005/0262710 A1 * | 12/2005 | Moreno ....................... 30/394 |
| 2008/0184569 A1 * | 8/2008 | Moreno ....................... 30/392 |

* cited by examiner

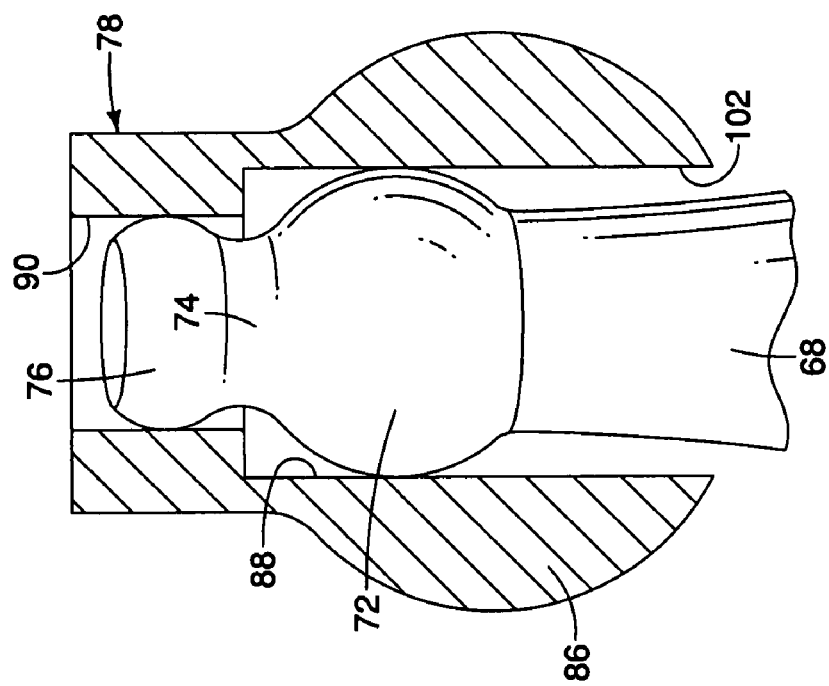
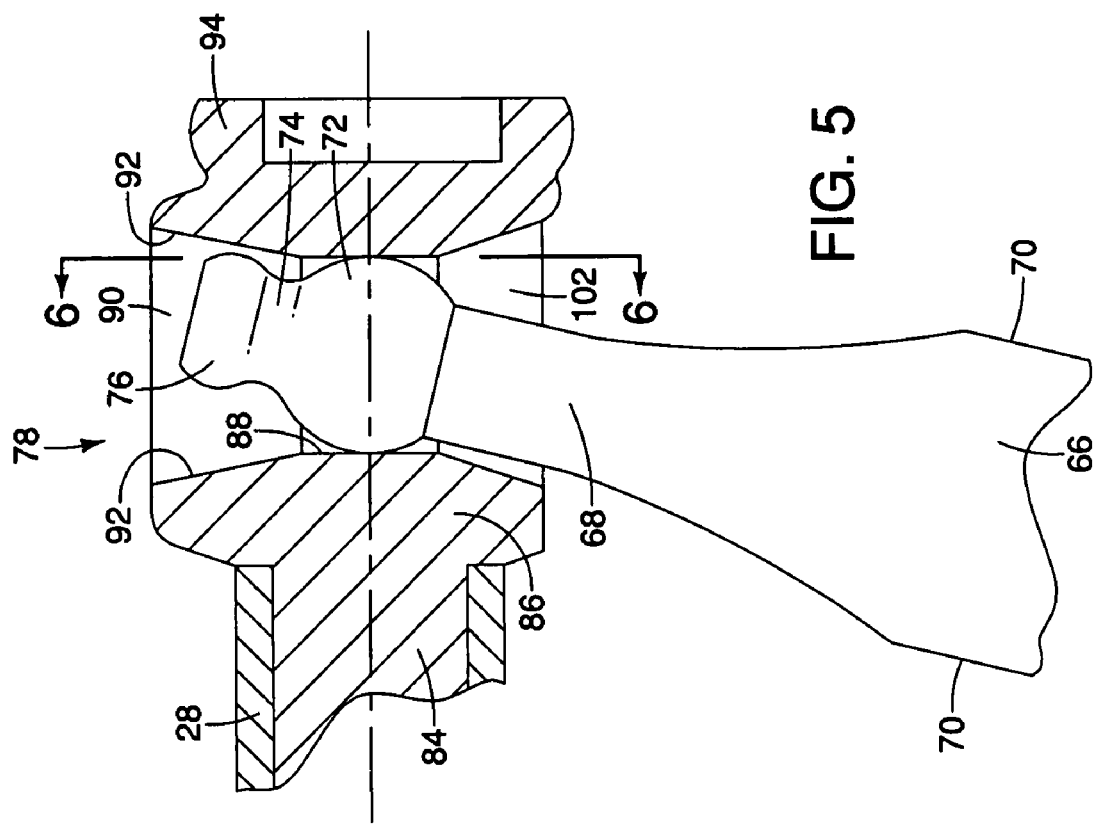
FIG. 6
FIG. 5

US 7,707,729 B2

DRIVE MECHANISM FOR A RECIPROCATING TOOL

BACKGROUND OF THE INVENTION

The present invention generally relates to power hand tools, and more particularly, to power reciprocating tools.

Reciprocating tools that are motor driven, such as saber saws, larger reciprocating saws and the like are usually driven by electric motors that have a rotating output shaft. The rotating motion must be translated into reciprocating motion for moving a saw blade or the like in a reciprocating manner. While various types of mechanisms have been known in the art for translating the rotation motion into reciprocating motion, one common type of motion conversation mechanism is known as a wobble plate drive. A wobble plate drive shaft is typically connected to the motor through a gear arrangement to reduce the speed of rotation of the motor output shaft and the wobble plate drive causes a wobble arm to reciprocate in a path that is parallel to the motion of the saw blade or the like. The blade of a reciprocating saw is mounted in a blade clamping mechanism that is located at the end of a plunger, the other end of which is operatively connected to a wobble arm.

SUMMARY OF THE INVENTION

Embodiments of a reciprocating drive apparatus are disclosed which comprise a housing, a drive shaft rotatably mounted in the housing, a motor in the housing for driving the drive shaft, an elongated plunger located in the housing for reciprocating motion, the plunger being driven by a wobble plate interface structure and pivotally supported in a front bushing and in a manner permitting the plunger to rotates about an axis of rotation aligned with the longitudinal axis of the plunger, the plunger having a front end portion for attaching a tool, and an enlarged rear end spherical portion, a counterweight assembly including a movable counterweight and a drive arm for moving the counterweight located in the housing, the counterweight having an opening for receiving the plunger, wherein the opening has at least cylindrical side wall portions that are sized and configured to support the rear end spherical portion of the plunger as the plunger and counterweight move relative to one another, a first wobble plate assembly operatively connected to the drive shaft and having a first wobble plate interface structure for engaging and reciprocating the plunger in the front bushing and the counterweight; and a second wobble plate assembly operatively connected to the drive shaft and having a second wobble plate interface structure for engaging the drive arm of the counterweight assembly.

DESCRIPTION OF THE DRAWINGS

FIG. 5 is side view, partially in section of the portion of embodiment shown in FIGS. 1-4;

FIG. 6 is an end view of a portion of interior construction of portion of the embodiment shown in FIG. 1-4, shown partially in section; and particularly illustrating the relationship of ball type interfaces with the receiver portion of a plunger, with the cross section taken generally along the line 6-6 in FIG. 5;

DETAILED DESCRIPTION

The preferred embodiments of the present invention are reciprocating drive mechanisms for a reciprocating tool such as a reciprocating saw, the general size and shape of which is similar to saws that are currently marketed. The present invention is also adapted for other types of tools such as saber saws, for example, or other types of tools that have a reciprocating action and are powered by a motor having a rotating output shaft.

Figure 1:
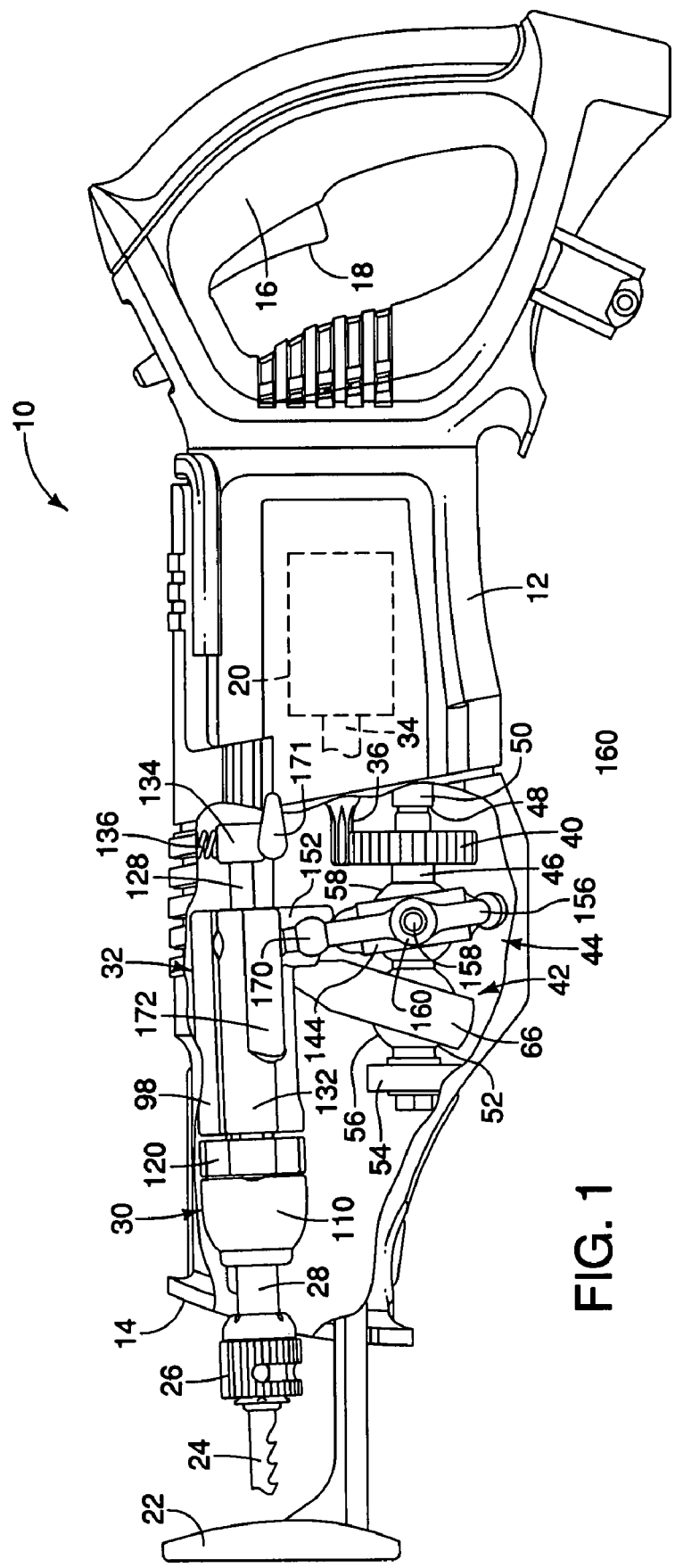
FIG. 1 is a left side view of a reciprocating saw with portions removed to show a first preferred embodiment of a reciprocating drive mechanism.
Figure 2:
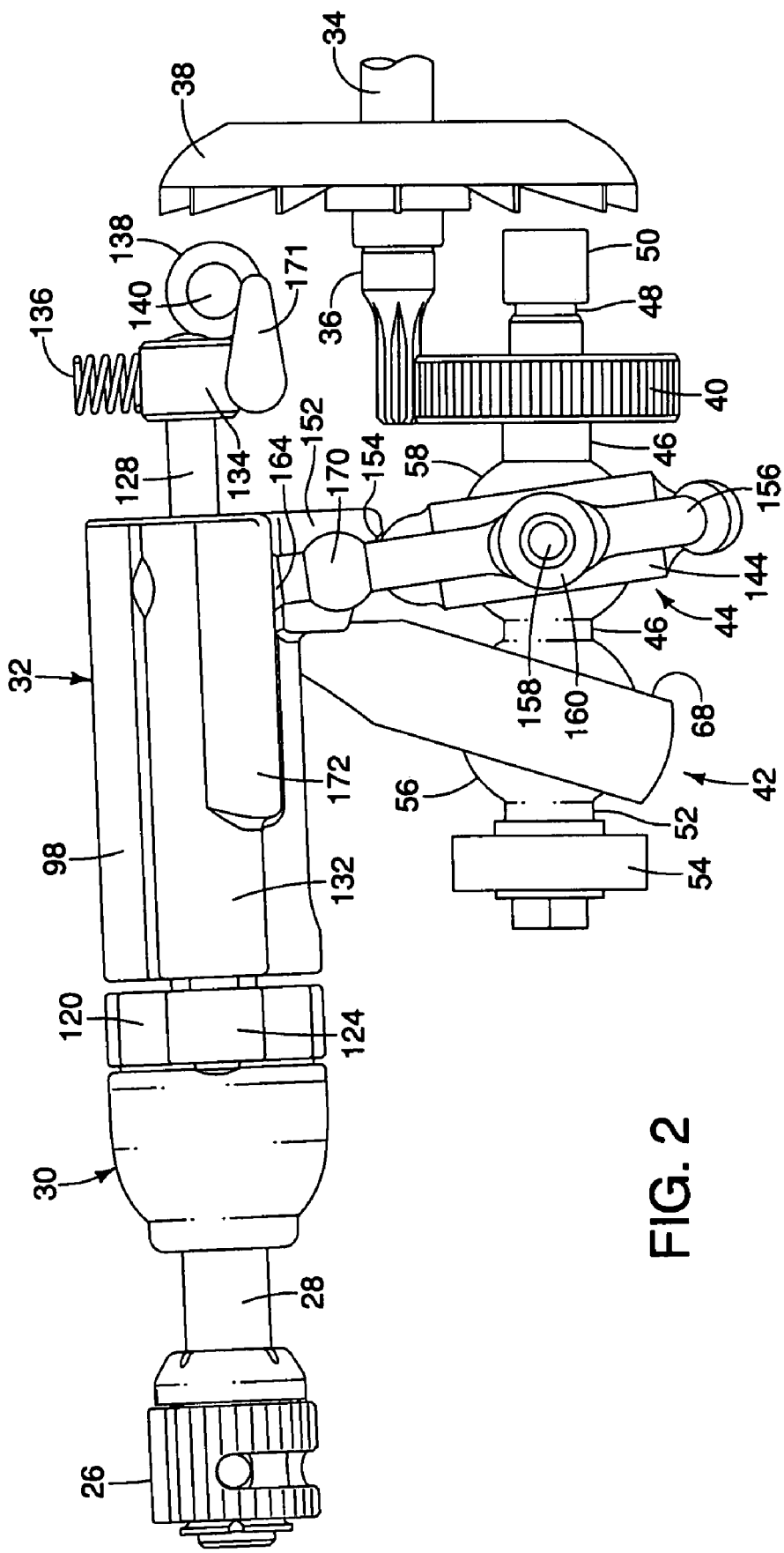
FIG. 2 is a left side view of the first preferred embodiment of a reciprocating drive mechanism shown in FIG. 1, and also illustrating portions of the reciprocating saw.

As shown in FIG. 1, a reciprocating saw, indicated generally at 10, has an outer housing 12 which includes a nose portion 14 that is flared outwardly so that a user can hold the nose portion with one hand while holding a handle 16 with the other. A trigger switch 18 is provided in the handle portion for turning on a motor 20 that drives the tool. The saw has a shoe 22 at the nose end portion 14 and a saw blade 24 is mounted in a blade clamping mechanism 26 that is mounted at the end of an elongated plunger, indicated generally at 28, which is slideable in a front bushing assembly, indicated generally at 30 and in a counterweight assembly indicated generally at 32. As shown in FIGS. 1 and 2, the motor 20 has an output shaft 34 with a pinion gear 36 and fan member 38 operatively attached to the shaft 34, with the gear 36 engaging a larger gear 40 that is connected to a two wobble plate assemblies, indicated generally at 42 and 44, which respectively drive the plunger 28 and counterweight assembly 32 in a reciprocating manner and in an opposite direction relative to one another as the gear 38 drives the wobble shaft assemblies 42 and 44.

More particularly, the wobble shaft assemblies 42 and 44 have a drive shaft indicated generally at 46, to which the gear 40 is attached. The shaft has an end portion 48 that is supported in a ball bearing 50 or the like and its opposite end 52 supported in another ball bearing 54 that is mounted in the housing 12. It should be understood that the manner in which the motor 20, gears 36 and 40 as well as the shaft 46 are mounted in the housing 12 is not in and of itself part of the present invention and the manner in which the housing 12 is constructed and the rotating parts are supported is well known to those of ordinary skill in the art.

With regard to the wobble plate assemblies 42 and 44, and referring to FIGS. 1-4, the shaft 46 has two spaced apart enlarged portions 56 and 58, each of which has generally cylindrical shaped portions 60 and 62 (see FIG. 4) that are oriented at an acute angle relative to the axis of the shaft 46 and ball bearings 64 (see FIG. 4) are provided to permit the arms of wobble plate assemblies 42 and 44 to move in a left and right direction relative to the cylindrical portions 60 and 62 as the shaft 46 is rotated during operation.

Figure 3:
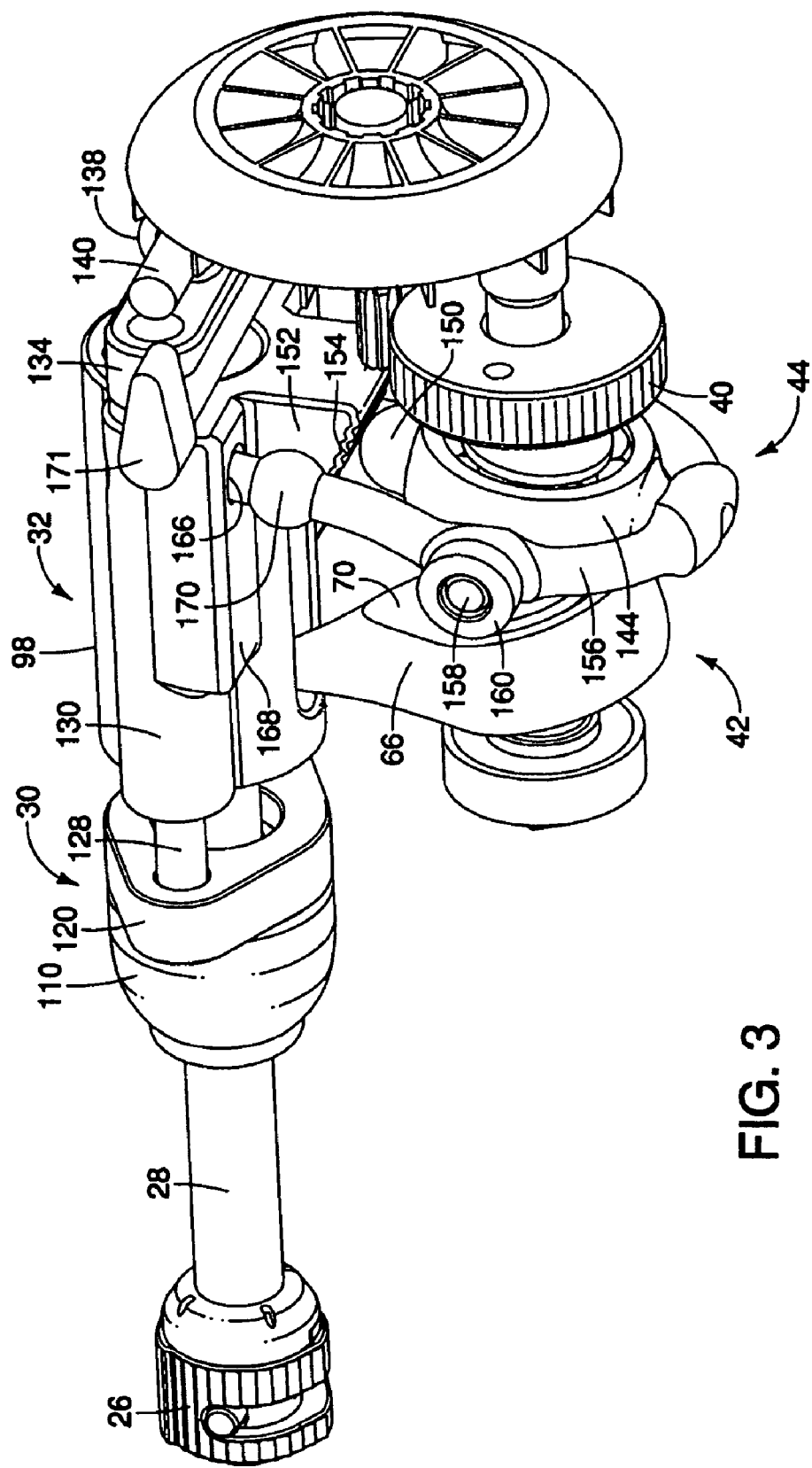
FIG. 3 is a lower rear left perspective view of the first preferred embodiment of a reciprocating drive mechanism shown in FIGS. 1 and 2.
Figure 4:
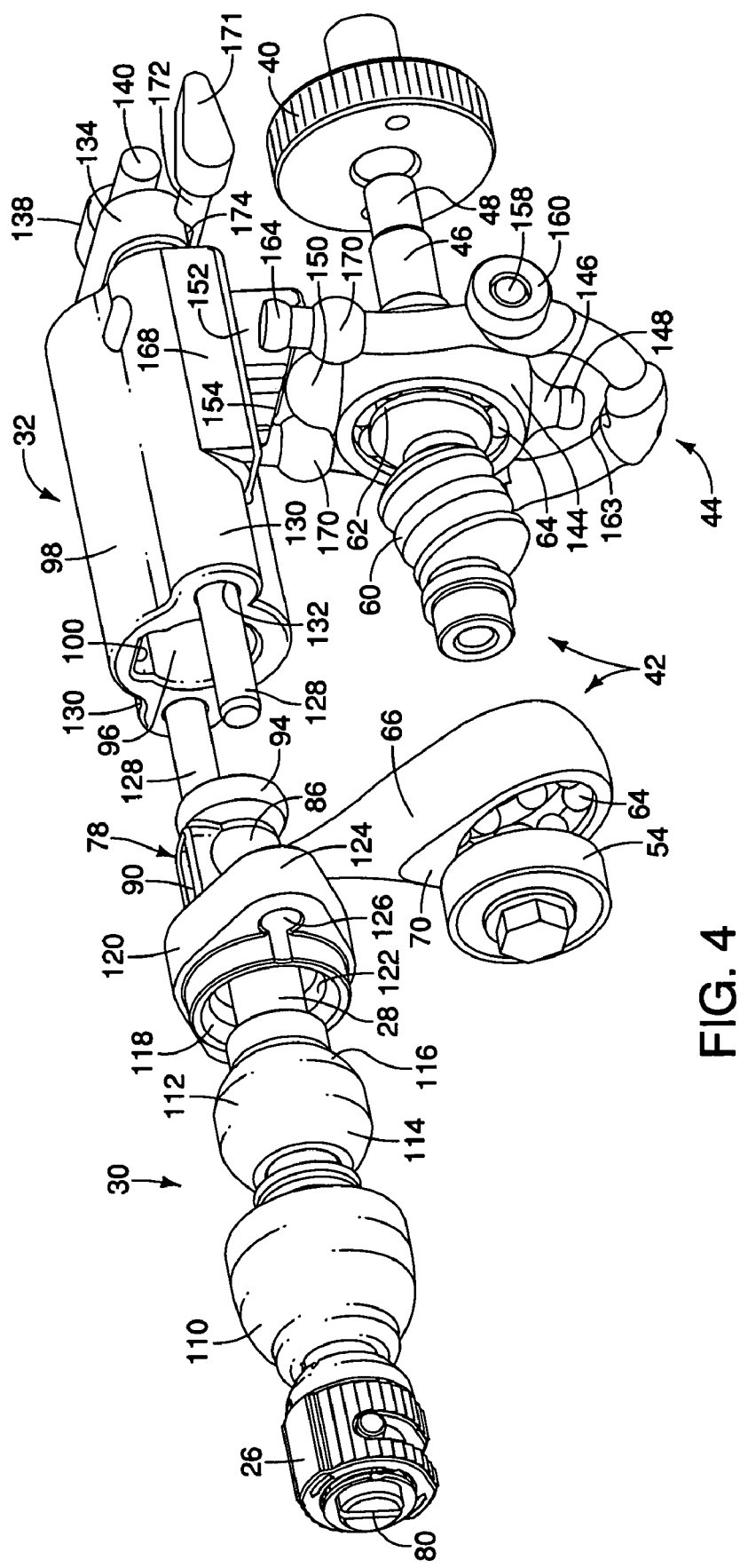
FIG. 4 is an upper front left partially exploded perspective view of the first preferred embodiment of a reciprocating drive mechanism shown in FIGS. 1 2 and 3.

More particularly, as the shaft 46 is rotated, the angular orientation of the cylindrical portion 60 changes, and an arm 66 of the wobble plate assembly 42 is moved in a reciprocating manner, i.e., to the left as shown in FIGS. 3 and 4, and to the right as shown in FIGS. 1 and 2. As is shown in FIGS. 1-6, the arm 66 has generally flat sides 70 that extend from the bottom upwardly which then merges into a curved outer end member 68 that reduces in size and becomes circular shaped in cross-section. It then merges with a first ball-type interface 72 that in turn merges into a transition portion 74 that in turn merges into a second ball-type interface 76. The interfaces 72 and 76 have a generally spherical form, albeit truncated, and they are sized to fit within cooperative structure of a receiver member 78 that is preferably attached to the inner end of the plunger 28. It should be understood that these ball-type interface portions do not need to be strictly spherical but are desirably generally near-spherically shaped so that point contact is made between these interfaces and the receiver member 78 of the plunger 28.

Referring to FIGS. 4, 5 and 6, the plunger 28 has a left outer end solid generally cylindrical portion that has a vertical slot 80 (see FIG. 4) in which the shank end of the blade 24 may be inserted. The end also has an aperture (not shown) in which a pin 82 of the blade clamping mechanism 26 may be attached. At the opposite end of the plunger 28 is the receiver member 78 that has a cylindrical extension 84 that is sized to closely fit within the interior of the plunger 28 and which is also preferably braised to securely hold the two components together inasmuch as extreme forces are applied to the plunger 28 during operation. Alternatively, the receiver member 78 may be formed with the plunger 28 as a single integral structure.

The receiver member 78 has a main body 86 that has a circular opening 88 that merges into an elongated slot 90, the lengthwise direction of which is oriented in the same direction as the axis of the plunger 28 as shown in FIGS. 4 and 5. The ends of the slot 90 are flared outwardly as shown at 92 to accommodate the reciprocating motion that is caused by the elongated arm 66 and particularly the ball-type interfaces 72 and 76 that are positioned in the opening 88 and slot 90, respectively. As shown in FIGS. 5 and 6, the first ball-type interface 72 is positioned in the opening 88 with the outside of the interface being generally in a point contact with the sidewall of the opening 88. The second ball-type interface 76 also rides in the slot 90, and as is also shown in FIGS. 5 and 6, the diameter of the interface 76 is only slightly smaller than the width of the slot 90 and thereby effectively prevents the plunger 28 from rotating out of its generally vertical plane of movement.

Because of the preferably spherical-shaped configuration of the interfaces 72 and 76 being positioned in the respective opening 88 and slot 90, each of which have straight wall surfaces that are contacted, there is only point contact between the interfaces and the sidewalls during the entire movement of the elongated wobble arm 66. This point contact results in the advantages of reduced wear between the interfaces and the receiver member 78 and less heat being generated during operation. Also, because of the curvature of the ball interface portions with the vertical walls being contacted, there is only point contact at all times, regardless of the tolerances and clearances between the parts. It is also preferred that grease be applied to the receiver member 78 to further reduce friction between the ball-type interfaces and the receiver member 78.

The receiver member 78 has a spherical rear end portion 94 that is configured to fit within and slide in an opening 96 in a counterweight body 98 of the counterweight assembly 44. The opening 96 also has an enlarged generally rectangular recess portion 100 that is sized to enable the top portion of the main body 86 of the receiver member 78 to fit within the opening 96 and recess 100 during reciprocating movement of the plunger 28 and receiver member 78 relative to the counterweight body 98 which also is driven in a reciprocating manner. The bottom of the receiver member 78 has an axial slot 102 that is sized to permit non-contacting movement of the arm 66 with the receiver member 78. The use of the spherical end portion 94 does not require critical tolerances of the outside diameter relative to the counterweight body opening 96 and therefore reduces manufacturing costs.

From the foregoing, it should be understood that the wobble plate assembly 42 drives the plunger 28 in a reciprocating manner and thereby causes the blade 24 to be moved in a cutting action. The plunger 28 slides in the front bushing assembly 30 that comprises a spherical cover plate 110 that is mounted in the housing 12 and has an opening in which the plunger is located. The plunger is supported near the nose portion 14 of the saw 10 by a front spherical bushing 112 (best shown in FIG. 4) that has a front spherical surface portion 114 that engages a complementary interior spherical surface in the spherical cover plate 110. The front spherical bushing 112 also has a rear spherical surface 116 that engages a complementary spherical surface 118 that is provided in a front rod support bracket 120 that is retained in a stationary position by suitable structure of the housing 12.

Thus, the spherical bushing 112 is captured between the spherical cover plate 110 and the front rod support bracket 120, both of which contain semi-spherical sections that allow the bushing 112 to be freely rotationally movable which permits self-alignment of the plunger 28 in the spherical bushing 112. As previously described, the opposite ends of the plunger has the receiver member 78 which has the spherical bushing section 94 supported in the opening 96 of the counterweight body 98. The front spherical bushing 112 acts as a pivot point that enables the right end portion of the plunger 28 to be moved up and down a slight distance which can similarly cause an attached blade to be moved in an orbital path as it is reciprocated during operation. Such minor vertical movement of the right end of the plunger, including the receiver member 78 can be made relative to the arm 66 of the wobble plate assembly 42 because the interfaces 72 and 76 located on the end of the wobble plate arm 66 can be moved a slight vertical distance relative to the receiver member 78 without detrimentally affecting the operation of the saw 10.

The front rod support bracket 120 has a central opening 122 through which the plunger 28 can pass and it has a pair of side flange extensions 124 located on opposite sides thereof, each of which has an opening for receiving one of a pair of rods 128. The rods 128 are provided to support the counterweight body 98 in a sliding relationship. In this regard, the counterweight body 98 has side extensions 130 on opposite sides thereof with openings 132 that extend the entire length of the extension and are sized to receive the rods 128. The opposite ends of the rods 128 are secured in a rear support bracket 134. A spring 136 is interposed between an inside surface of the housing 12 and the top of the rear support bracket 134 (see FIG. 1) for imparting a downward biasing force on the bracket 134. While the spring 136 is only shown in FIGS. 1, 2, 7 and 9, it should be understood that it is provided in all of the embodiments of the present invention.

From the foregoing, it should be understood that the counterweight assembly has the counterweight body 98 that is reciprocated along the rods 128 and the rods are supported in the front by the front rod support bracket and in the rear by the rear support bracket 134 and these brackets are generally floating in the housing and pivot about the front bushing assembly 30 as previously described. The spring 136 is provided to bias the rear support bracket 134 toward its downward position. A rubber or other resilient roller 138 is mounted on a shaft 140 that is secured by the housing 12 and positioned adjacent to the end surface of the rear support bracket 134 to apply a holding force to the bracket 134 during operation. The roller 138 preferably rotates on the shaft 140 and permits the bracket 134 to move up and down during desired orbital action.

The reciprocating mechanism is designed and configured to move the plunger 28 and counterweight assembly 32 in a manner to create an orbital movement of the blade which improves the cutting performance of the saw and to also reduce the vibration of the saw during operation.

To reduce the vibration that is generated by reciprocal saws, the counterweight assembly 32 is reciprocated simultaneously with the reciprocation of the plunger 28. It is done in a manner whereby the direction of movement of the counterweight assembly 32 is opposite that of the plunger 28 which tends to balance the forces that are produced during operation. The size of the counterweight assembly 32 is determined to create the same amount of force that is generated by the plunger and its associated moving parts so that the forces in opposite directions tend to neutralize one another. While the wobble plate assembly 42 drives the plunger and its associated parts, the counterweight assembly 32 is driven by the counterweight wobble plate assembly 44, and both wobble plate assemblies are driven by the same drive shaft 46.

The counterweight wobble plate assembly 44 comprises an interface structure 144 that rides on the cylindrical portion 62 of the drive shaft 46. The interface structure 144 completely surrounds the drive shaft 46 and has a lower extension 146 with a spherical drive ball 148 and an upper generally spherical extension 150 which is positioned to engage a lower extension 152 of the counterweight body 98. More particularly, the extension 152 has a ramped surface 154 with transverse corrugations or steps (best shown in FIG. 3) which create an impact insertion of the blade 24 into material that is being cut by the saw 10. As the counterweight wobble plate assembly 44 operates during rotation of the drive shaft 46, the interface structure 144 will move so that the ball 150 will ride up and down the ramp surface 154 and cause the counterweight and therefore the right end of the plunger 28 to move up and down and cause an orbiting movement of the blade 24.

The interface structure 144 drives a generally U-shaped drive arm 156 that has a pair of spherical side extensions 158 that are retained in cylindrical bushings 160 that are fixed by suitable structure to the inside of the housing 12 as is known to those of ordinary skill in the art. Thus, there are pivot points on opposite sides of the U-shaped drive arm 156 and the spherical drive ball 148 fits within a cylindrical recess 162 in the bottom of the drive arm 156. The upper ends of the U-shaped drive arm have truncated spherical balls 164 which fit within openings 166 which are provided in a lower side extension 168 on each side of the counterweight body 98. The balls 164 are approximately the size of the openings 166 and they similarly have generally point to point contact between the ball and the opening during operation.

Each of the arms also preferably include an enlarged spherical portion 170 which is larger than the opening 166 and which balance the counterweight body 98 so that neither of the balls 164 penetrate too deeply into the opening 166 in the lower extension 168 which could interfere with the point to point contact between the drive arm ends and the cylindrical surface of the openings 166. It should also be understood that during the vertical movement of the counterweight body 98 caused by the ratcheting action of the ball 150 contacting the ramp surface 154 of the counterweight body 98, the balls 164 of the drive arm 156 will increase and decrease their penetration into the openings 166. However, the amount of movement is controlled by the design and configuration of these cooperating components so that there is no possibility that the balls 164 can separate from the openings 166.

The orbital action can be selectively turned on and off by use of a lever 171 that is connected to a rod 172 that has a notch 174 in it that extends the length of the support bracket 134 as is best shown in FIG. 4. The lever 171 is shown in a generally horizontal position with the notch being oriented so that it is open upwardly which permits the rear support bracket 134 to be pushed downwardly against the bottom of the notch 174. The rod 172 is pivotally supported in suitable structure of the housing 12 with the lever 171 extending outwardly through the wall of the housing 12 so that it is available to an operator for the purpose of turning the orbital action on and off.

If the lever 171 is rotated 90° in either direction, the rear support bracket 134 will be elevated to the elevation of the rod 172 that would exist were the notch 174 not present and in this position, the action of the spherical ball 150 against the inclined surface 154 will have no orbital effect because the ball will not be in any appreciable contact with the ramp surface to cause upward movement of the counterweight body 98 during operation of the saw 10.

The embodiment shown in FIGS. 1-6 has an advantage of providing an orbital movement of the blade with a ratcheting action which can provide improved cutting performance. The design of the mechanism also reduces vibration and friction. The reduced friction is a result of the self-alignment system that has the front spherical bushing 112 providing a freedom of movement by permitting rotation of the plunger 28 as well as pivoting movement in both the vertical and horizontal directions which enables the plunger to be aligned in a manner that reduces friction.

Also, the reduction in vibration is a result of the counterweight mass having a center of gravity that is very close to the axis of the plunger. The rear portion of the plunger 28 is supported by the spherical portion 94 of the receiver member 78 which is free to slide inside the counterweight. The effective orbit arm comprises the spherical cover plate 110, the front and rear support brackets 120 and 134 as well as the rods 128 and counterweight body 98. The orbit arm is maintained in a forward position by the roller 138 and is biased in the downward position by the spring 136.

Figure 7:
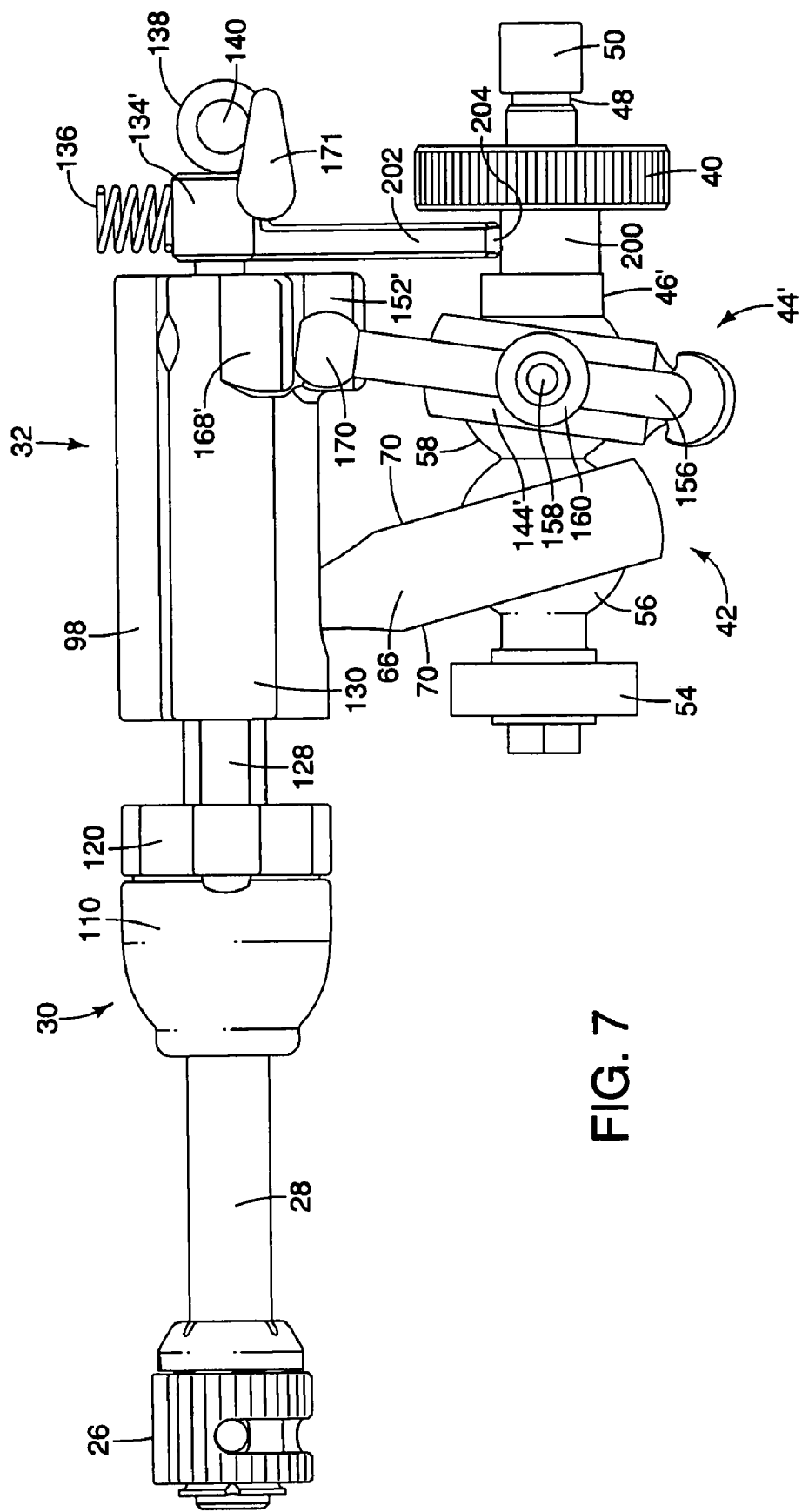
FIG. 7 is a left side view of a second preferred embodiment of a reciprocating drive mechanism, and also illustrating portions of a reciprocating saw.
Figure 8:
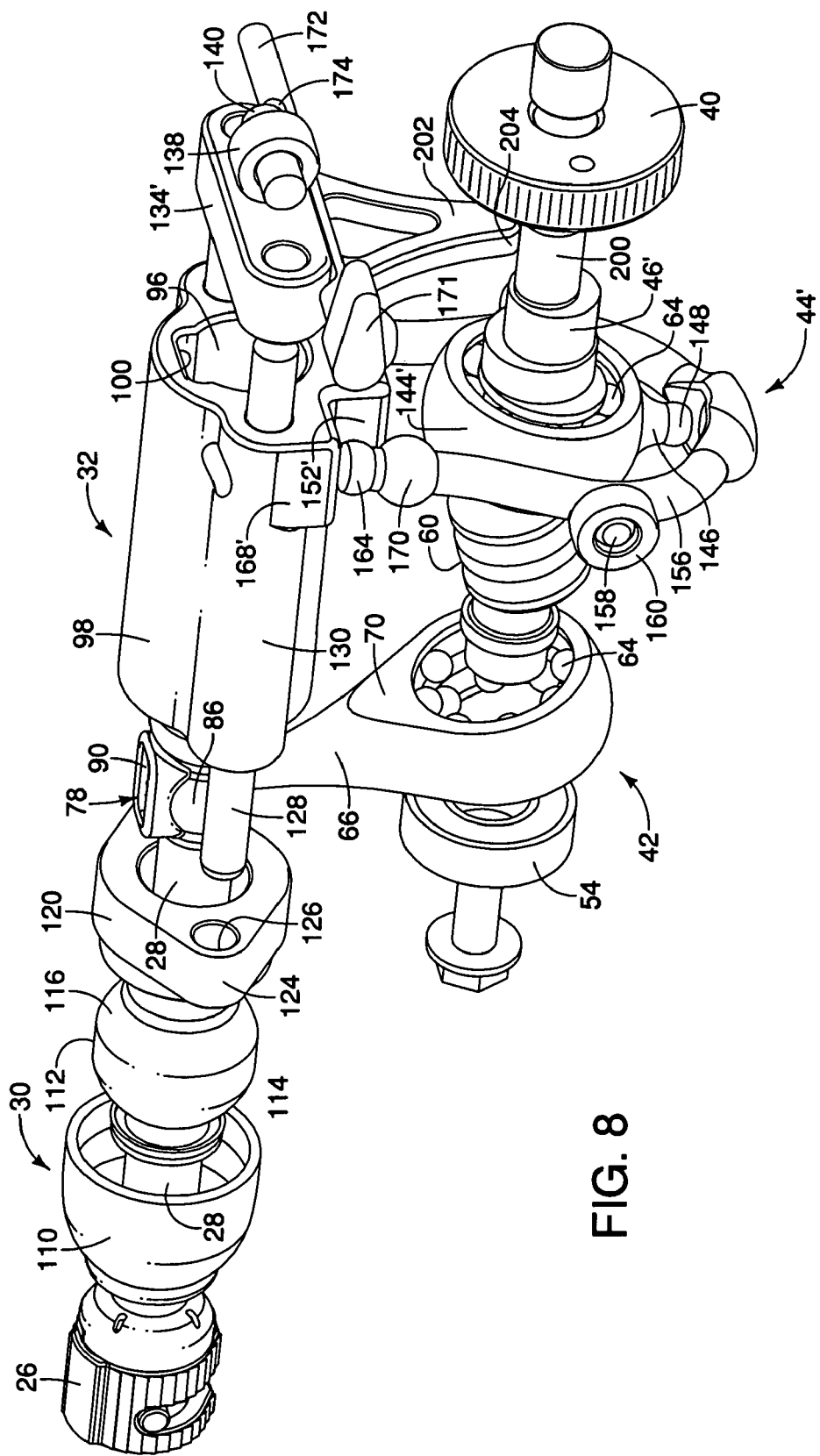
FIG. 8 is a partially exploded upper rear left perspective view of the second preferred embodiment of a reciprocating drive mechanism shown in FIG. 7.

A second preferred embodiment of the present invention is shown in FIGS. 7 and 8 and will not be described in detail except insofar as it has modified or additional features and structure compared to the embodiment of FIGS. 1-6. Therefore, where components have reference numbers that are the same as has been shown and described in the first preferred embodiment of FIGS. 1-6, the structure and function will be substantially similar to the previously described first preferred embodiment. To the extent that components are modified relative to the components shown in FIGS. 1-6, they will carry a prime or double prime designation to indicate they are modified and where necessary or appropriate, the description of the modified component will be provided. New and different aspects of the alternative embodiments will carry reference numbers beginning with the number 200.

Turning now to FIG. 7, the drive shaft 46' is modified so that it has a smooth cam shaped portion 200 that is off-centered relative to the axis of the drive shaft 46'. Also, the rear support bracket 134' has a downward extension 202 which has a generally V-shaped configuration as shown in FIG. 8, and which has a lower end 204 that contacts the cam surface 200 of the drive shaft 46'. In this configuration, the interface structure 144' does not have a spherical ball at its upper portion (like ball 150 in FIG. 3) and the lower extension 152' does not have a ramped surface. The orbital action is therefore a result of the lower extension 202 acting as a cam follower for providing the orbital action of the blade 24. It should be appreciated that the cam follower follows the smooth cam surface 200 and therefore this embodiment does not produce a ratcheting orbital action as was the case with regard to the embodiment shown in FIGS. 1-6. The lever 171 is operable to selectively turn the orbital action on and off in this embodiment.

Figure 9:
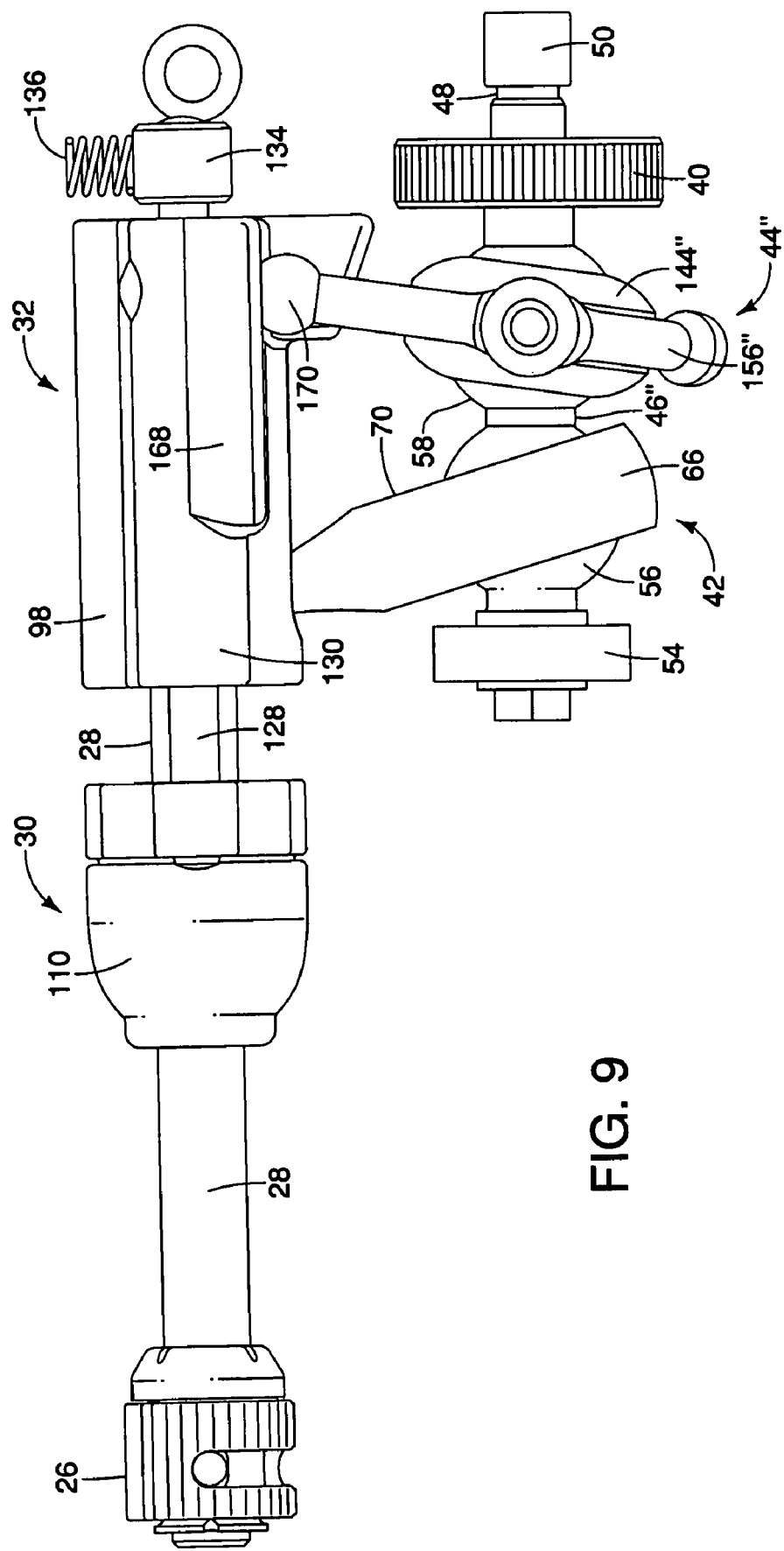
FIG. 9 is a left side view of a third preferred embodiment of a reciprocating drive mechanism, and also illustrating portions of a reciprocating saw.
Figure 10:
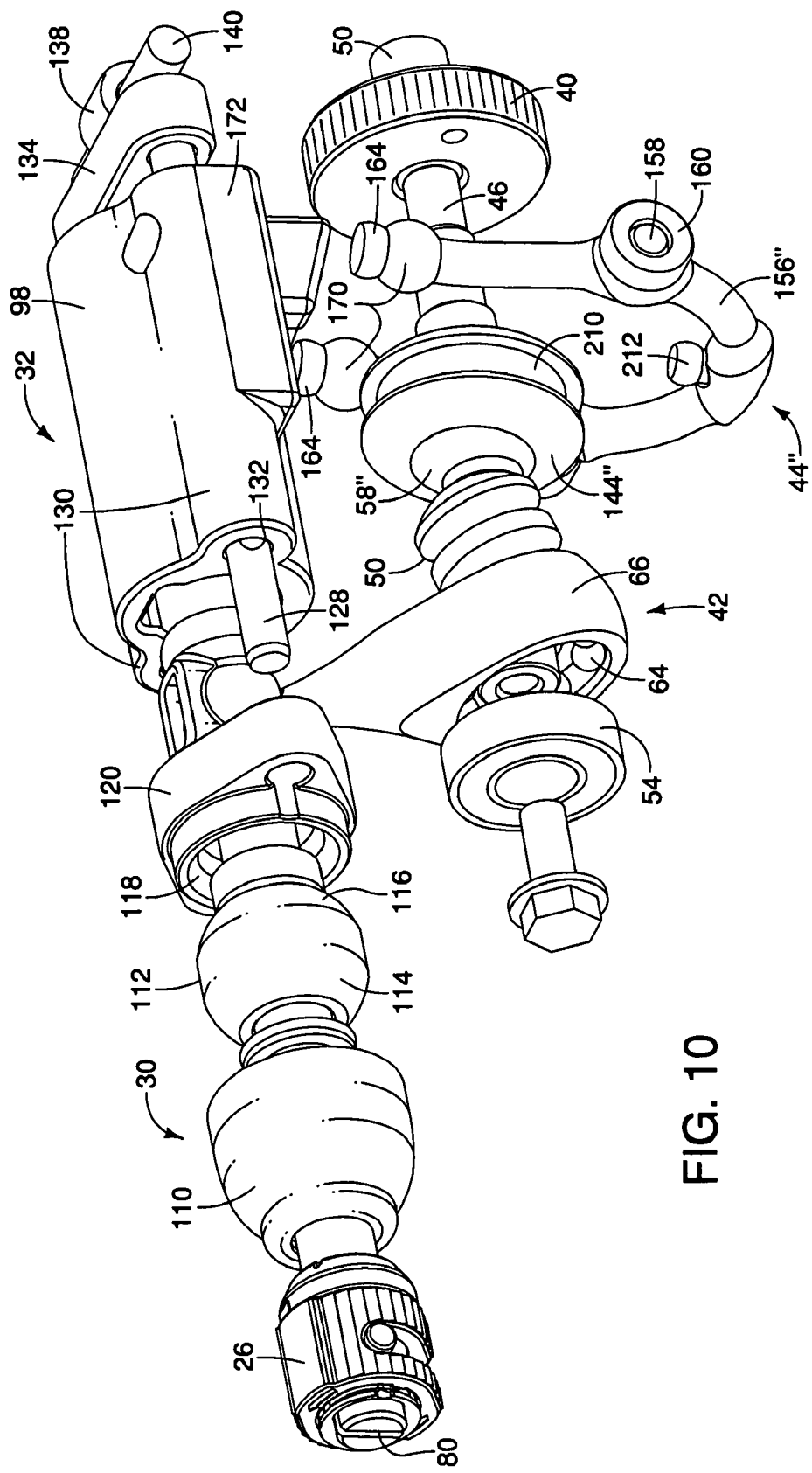
FIG. 10 is an upper front left perspective partially exploded view of the third preferred embodiment of a reciprocating drive mechanism shown in FIG. 9, and also illustrating portions of a reciprocating saw.

In the third preferred embodiment shown in FIGS. 9 and 10, a less expensive to manufacture counterweight wobble plate assembly 44" is provided which dispenses with internal ball bearings and has a simplified interface structure 144" that has an external circumferential groove 210 that cooperates with a ball 212 provided on the drive arm 156" for driving the counterweight 32. It should be understood that the interface structure 144" can be formed with the drive shaft 46" or it could also be provided with a ball bearing construction so that it could rotate relative to the enlarged portion 58" of the drive shaft 46". This embodiment also does not have orbital action capability and therefore the lever 171 is not present.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A reciprocating saw, comprising;
    a housing;
    a drive shaft rotatably mounted in said housing;
    a motor in the housing for driving said drive shaft;
    an elongated plunger located in said housing for reciprocating motion, said plunger being driven by a wobble plate interface structure and pivotally supported in a front bushing in a manner which does not prohibit rotation of said plunger about an axis of rotation aligned with the longitudinal axis of said plunger, said plunger having a front end portion for attaching a tool, and an enlarged rear end spherical portion;
    a counterweight assembly including a movable counterweight and a drive arm for moving said counterweight located in said housing, said counterweight having an opening for receiving said plunger, wherein said opening has at least cylindrical side wall portions that are sized and configured to directly contact and support said rear end spherical portion of said plunger as said plunger and counterweight move relative to one another;
    a first wobble plate assembly operatively connected to said drive shaft and having a first wobble plate interface structure for engaging and reciprocating said plunger in said front bushing and said counterweight; and
    a second wobble plate assembly operatively connected to said drive shaft and having a second wobble plate interface structure for engaging said drive arm of said counterweight assembly.

2. A reciprocating saw as defined in claim 1 wherein said first and second wobble plate assemblies are configured so that their respective interface structures move in opposite directions during operation.

3. A reciprocating saw as defined in claim 1 wherein said counterweight assembly comprises a pair of spaced apart parallel rods mounted in front and rear rod support brackets, said counterweight having extensions on opposite sides thereof with apertures in which said rods are located, said counterweight being slidable on said rods during operation.

4. A reciprocating saw as defined in claim 3 wherein said drive arm has a generally U-shaped configuration wherein the bottom portion of the arm extends around said drive shaft and the upper end portions engage said side extensions of said counterweight, the arm being pivotable about pivot connections that are generally midway between the top and bottom of said U-shaped arm and on an axis that extends generally through said drive shaft.

5. A reciprocating saw as defined in claim 4 wherein said front and rear brackets and rods of said counterweight assembly are configured to be vertically pivotable around said front bushing and rotatable and slidable about said plunger.

6. A reciprocating saw as defined in claim 4 wherein each of said side extensions have a recess with a cylindrical portion having a predetermined diameter for receiving one of the upper end portions of said arm, said end portions having a generally spherical shape and a diameter slightly smaller than said predetermined diameter so that said end portions make generally point contact with said cylindrical portion of said recesses.

7. A reciprocating saw, comprising;
    a housing;
    a drive shaft rotatably mounted in said housing;
    a motor in the housing for driving said drive shaft;
    an elongated plunger located in said housing for reciprocating motion, said plunger being driven by a wobble plate interface structure and pivotally supported in a front bushing in a manner which does not prohibit rotation of said plunger about an axis of rotation aligned with the longitudinal axis of said plunger, said plunger having a front end portion for attaching a tool, and an enlarged rear end spherical portion;
    a counterweight assembly including a movable counterweight and a drive arm for moving said counterweight located in said housing, said counterweight having an opening for receiving said plunger, wherein said opening has at least cylindrical side wall portions that are sized and configured to support said rear end spherical portion of said plunger as said plunger and counterweight move relative to one another;
    wherein said counterweight has an inclined ramp portion extending downwardly toward said second wobble interface structure, and said second wobble interface structure further comprises an upper extension with a generally spherical end portion for engaging said ramp portion, said second wobble plate assembly driving said arm and said counterweight in a reciprocating manner during operation, and said spherical end portion of said upper extension engaging said ramp portion and causing said rear end portion of said plunger to pivot around said front bushing;
    a first wobble plate assembly operatively connected to said drive shaft and having a first wobble plate interface structure for engaging and reciprocating said plunger in said front bushing and said counterweight; and
    a second wobble plate assembly operatively connected to said drive shaft and having a second wobble plate interface structure for engaging said drive arm of said counterweight assembly.

8. A reciprocating saw as defined in claim 7 wherein said ramp portion has a transverse corrugated surface for imparting impact forces on a tool attached to said saw.

9. A reciprocating drive apparatus, comprising;
    a housing;
    a drive shaft rotatably mounted in said housing;
    an elongated plunger located in said housing for reciprocating motion, said plunger being supported in a spherical front bushing that does not prohibit rotational movement about an axis of rotation aligned with the longitudinal axis of said plunger and permits pivotal movement thereof during reciprocating motion, said plunger having a front end portion for attaching a tool, and an enlarged rear end spherical portion;

a counterweight assembly including a movable counterweight and a drive arm for moving said counterweight located in said housing, said counterweight having an opening for receiving said plunger, wherein said opening is sized and configured to directly contact and support said rear end spherical portion of said plunger as said plunger and counterweight move relative to one another;

a first wobble plate assembly operatively connected to said drive shaft and having a first wobble plate interface structure for engaging and reciprocating said plunger in said front bushing and said counterweight; and a second wobble plate assembly operatively connected to said drive shaft and having a second wobble plate interface structure for engaging said drive arm of said counterweight assembly;

said first and second wobble plate assemblies being configured so that their respective interface structures move in opposite directions during operation.

10. A reciprocating drive apparatus comprising:

a housing;

a drive shaft rotatably mounted in said housing;

an elongated plunger located in said housing for reciprocating motion, said plunger having a rear end portion configured to engage a wobble plate interface structure and a front end portion for attaching a tool, said plunger having a spherical portion adjacent the rear end thereof;

a front bushing positioned in said housing for retaining said front end portion in a manner whereby said plunger is not restrained from rotating about a first axis of rotation;

a counterweight assembly positioned in said housing for receiving said rear end portion of said elongated plunger and including a movable counterweight and a drive arm for moving said counterweight, said counterweight having at least cylindrical side wall portions that are sized and configured to directly contact and support said spherical portion of said plunger as said plunger and counterweight move relative to one another;

a first wobble plate assembly operatively connected to said drive shaft and having an elongated arm with a first wobble plate interface structure for engaging said rear end portion of said plunger and reciprocating said plunger in said front bushing and said counterweight; and a second wobble plate assembly operatively connected to said drive shaft and having a second wobble plate interface structure for engaging said drive arm of said counterweight assembly.

11. Apparatus as defined in claim 10 wherein said first and second wobble plate assemblies are configured so that their respective interface structures move in opposite directions during operation.

12. Apparatus as defined in claim 10 wherein said counterweight assembly comprises a pair of spaced apart parallel rods mounted in front and rear rod support brackets, said counterweight having extensions on opposite sides thereof with apertures in which said rods are located, said counterweight being slidable on said rods during operation.

13. Apparatus as defined in claim 12 wherein said drive arm has a generally U-shaped configuration wherein the bottom portion of the arm extends around said drive shaft and the upper end portions engage said side extensions of said counterweight, the arm being pivotable about pivot connections that are generally midway between the top and bottom of said U-shaped arm and on an axis that extends generally through said drive shaft.

14. Apparatus as defined in claim 13 wherein said pivot connections connect said drive arm to said second wobble plate assembly about its effective pivot axis, said second wobble plate interface engaging the bottom of said U-shaped arm.

15. Apparatus as defined in claim 14 wherein each of said pivot connections comprise a generally cylindrical receiving structure on one of said arm and second wobble plate assembly in which a generally spherical extension from the other of said arm and second wobble plate assembly is inserted.

16. Apparatus as defined in claim 12 wherein said front and rear brackets and rods of said counterweight assembly are configured to be vertically pivotable around said front bushing and rotatable and slidable about said plunger.

17. Apparatus as defined in claim 16 further comprising a member mounted in said housing and bearing on said rear support bracket to limit movement of said rods, front and rear brackets away from said front bushing.

18. Apparatus as defined in claim 17 wherein said member comprises a resilient roller mounted for rotation on a generally horizontal shaft attached to said housing.

19. Apparatus as defined in claim 16 further comprising a spring positioned in said housing for applying a downward force on said rear bracket.

20. Apparatus as defined in claim 13 wherein each of said side extensions have a recess with a cylindrical portion having a predetermined diameter for receiving one of the upper end portions of said arm, said end portions having a generally spherical shape and a diameter slightly smaller than said predetermined diameter so that said end portions make generally point contact with said cylindrical portion of said recesses.

21. Apparatus as defined in claim 20 wherein said arms have larger spherical portions adjacent end portions, said larger spherical portions engaging said side extensions to substantially prevent rotation of said counterweight assembly about said plunger.

22. Apparatus as defined in claim 12 wherein said second wobble interface structure comprises a lower extension with a generally spherical end portion for engaging a generally cylindrical portion of a recess in the bottom of said U-shaped arm, said second wobble plate assembly driving said arm and said counterweight in a reciprocating manner during operation.

23. Apparatus as defined in claim 12 wherein said counterweight has an inclined ramp portion extending downwardly toward said second wobble interface structure, and said second wobble interface structure further comprises an upper extension with a generally spherical end portion for engaging said ramp portion, said second wobble plate assembly driving said arm and said counterweight in a reciprocating manner during operation, and said spherical end portion of said upper extension engaging said ramp portion and causing said rear end portion of said plunger to pivot around said front bushing.

24. Apparatus as defined in claim 23 further comprising a lever for selectively raising said rear end portion of said plunger to disengaging said spherical end portion from said ramp portion.

* * * * *